United States Patent [19]
Lutz

[11] Patent Number: 5,849,168
[45] Date of Patent: Dec. 15, 1998

[54] METHOD OF IN-MOLD COATING GOLF BALLS

[75] Inventor: Mitchell E. Lutz, Fairhaven, Mass.

[73] Assignee: Acushnet Company, Fairhaven, Mass.

[21] Appl. No.: 665,122

[22] Filed: Jun. 14, 1996

[51] Int. Cl.[6] .......................... B79C 39/17; B79C 41/70
[52] U.S. Cl. .................. 264/755; 264/279.1; 264/328.8; 473/368; 473/374; 473/378
[58] Field of Search ................................ 264/250, 279.1, 264/278, 255, 328.8; 473/368, 376, 378, 374

[56] References Cited

U.S. PATENT DOCUMENTS

| | | | |
|---|---|---|---|
| 3,068,522 | 12/1962 | Nickerson et al. | 264/278 |
| 3,216,877 | 11/1965 | Mohr | 156/230 |
| 4,076,780 | 2/1978 | Ditto | 264/40.5 |
| 4,076,788 | 2/1978 | Ditto | 264/255 |
| 4,081,578 | 3/1978 | van Essen et al. | 428/63 |
| 4,082,486 | 4/1978 | Cerano et al. | 425/129 |
| 4,189,517 | 2/1980 | Shanoski et al. | 428/423 |
| 4,205,028 | 5/1980 | Brueggemann et al. | 264/24 |
| 4,222,929 | 9/1980 | Shanoski et al. | 260/60 |
| 4,228,113 | 10/1980 | van Gasse | 264/24 |
| 4,239,796 | 12/1980 | Shanoski et al. | 428/315 |
| 4,239,808 | 12/1980 | Arnason | 428/462 |
| 4,242,415 | 12/1980 | Feltzin et al. | 428/412 |
| 4,245,006 | 1/1981 | Shanoski | 428/423 |
| 4,248,432 | 2/1981 | Hewitt et al. | 273/235 R |
| 4,287,310 | 9/1981 | van Gasse | 525/44 |
| 4,315,884 | 2/1982 | Van Gasse | 264/255 |
| 4,331,735 | 5/1982 | Shanoski | 428/423 |
| 4,414,173 | 11/1983 | Cobbledick et al. | 264/257 |
| 4,477,405 | 10/1984 | Makhlouf et al. | 264/250 |
| 4,499,235 | 2/1985 | Verwer et al. | 525/38 |
| 4,515,710 | 5/1985 | Cobbledick | 252/511 |
| 4,668,460 | 5/1987 | Ongena | 264/255 |
| 4,873,274 | 10/1989 | Cummings et al. | 523/500 |
| 5,006,297 | 4/1991 | Brown et al. | 264/234 |
| 5,048,838 | 9/1991 | Chikaraishi et al. | 473/374 |
| 5,122,046 | 6/1992 | Lavallee et al. | 264/278 |
| 5,132,052 | 7/1992 | Cobbledick et al. | 252/511 |
| 5,143,788 | 9/1992 | Johnson | 428/423.3 |
| 5,174,933 | 12/1992 | Toh et al. | 264/40.5 |
| 5,184,828 | 2/1993 | Kim et al. | 473/374 |
| 5,252,617 | 10/1993 | Werner et al. | 521/56 |
| 5,300,325 | 4/1994 | Nealon et al. | 427/407 |
| 5,304,332 | 4/1994 | Richart | 264/255 |
| 5,314,187 | 5/1994 | Proufit | 264/250 |
| 5,334,673 | 8/1994 | Wu | 273/235 R |
| 5,387,750 | 2/1995 | Chiang | 528/52 |
| 5,389,443 | 2/1995 | Banerjee et al. | 428/413 |
| 5,391,399 | 2/1995 | Cobbledick et al. | 427/370 |
| 5,409,233 | 4/1995 | Kennedy | 273/235 A |
| 5,461,109 | 10/1995 | Blair et al. | 524/839 |

OTHER PUBLICATIONS

"Vehicle Reports RRIM and In–Mold Coatability," *Modern Paint and Coatings*, p. 143, Oct. 1994.

M. Naitove et al., "In–Mold Coatings Advance on Many Fronts," *Plastics Technology*, p. 23, May 1992.

D. Webber, "In Mould Coatings," *Polymers Paint Colour Journal*, 180(4274):735–738, Dec. 12, 1990.

M. H. Caropreso et al., "Technology Advancements for In–Mold Coating of Thermoplastic Resins", *Mod. Paint Coatings*, 80(7):I–1–I–3, 1990.

P. Dutta, "Coating for Plastics Components," *Popular Plastics*, 32(10):21–22, Oct. 1987.

"In–Mould Coating Shows its Colours," Industrial Scene, *EM&D*, p. 5, Mar. 1987.

R. J. Heath et al., "The Surface Coating of Polyurethane Substrates, Part 1: A Review of Processing Practices from Theoretical Concepts," *Cellular Polymers*, 6:1–28, 1987.

"In–Mould Paints for R–RIM Urethanes," *European Plastics News*, 12(2):2, Feb. 1985.

Agrawal et al., "Characterization of In–Mold Coatings on RIM Encapsulated Modular Windows", Int'l Congress and Exposition, Detroit, Michigan, Feb. 25–Mar. 1, 1991, No. 910755, pp. 1–8.

Brix et al., "Methods for In–Mould Coating of Polyurethane Mouldings for the Automotive Industry", Kunststoffe German Plastics 77 9:4–7 (1987).

Brown, "The Use of Urethane In–Mold Coatings to Satisfy the Economic and Performance Needs of Window Encapsulation, Now and Tomorrow", Int'l Congress and Exposition, Detroit, Michigan, Feb. 24–28, 1992, No. 920199, pp. 1–17.

Caropreso et al., "Technology Advancements for In–Mold Coating of Thermoplastic Resins", RETEC '90 (Rochester, NY) Sep. 18–19, 1990, pp. I1–I3.

Dreger, "Smooth, Ripple–Free Plastic Panels", Machine Design, Jun. 21, 1979, 108–113.

Guidetti et al., "New Approach to CFC Free Steering Wheels", Polyurethanes World Congress 1991, Sep. 24–26, 1991 Acropolis, Nice, France, pp. 450–455.

Graff, "In–mold Color Coating Readies for Industry Debut", Modern Plastics, Feb. 1995, pp. 52–53.

Heath et al., "The Surface Coating of Polyurethane Substrates", Cellular Polymers, vol. 6 1987, pp. 1–29.

Kuyzin et al., "Factors Influencing High–Density SRIM Surface Quality", Polyurethanes World Congress 1991, Sep. 24–26, 1991 Acropolis, Nice, France, pp. 810–819.

(List continued on next page.)

*Primary Examiner*—Jan H. Silbaugh
*Assistant Examiner*—Edmund H. Lee
*Attorney, Agent, or Firm*—Pennie & Edmonds LLP

[57] ABSTRACT

A method of applying a coating material to an outer surface of a golf ball, the method comprising molding a golf ball having an outer dimpled surface under a pressure greater than ambient pressure within a mold cavity; formulating a golf ball coating composition; introducing a sufficient amount of the coating composition into the mold cavity between the golf ball outer surface and an inner surface of the mold cavity to substantially surround and coat the entire outer surface of the golf ball; curing the coating composition upon the ball outer surface and removing the coated ball from the mold cavity.

25 Claims, No Drawings

OTHER PUBLICATIONS

Miller, "Finishing—Save Money by Molding, Painting at Same Time", Nov. 1992, p. 12.

Naitove et al., "In–Mold Coatings Advance On Many Fronts", Plastics Technology, May, 1992, p. 23.

Ongena, "The Mechanics of Molded Coating for Compression Molded Reinforced Plastics Parts", 33rd Annual Technical Conference 1978 Reinforced Plastics/Composites Institute The Society of the Plastics Industry, Inc., Sec. 14–B, pp. 1–7.

Rayle and Cassil, "Advancements in Injection In–Mold Coating Technology".

"PU Coatings Save Energy In Finishing Structural Foam", Plastics Technology, Nov., 1978, pp. 117–118.

Schroder, "Aqueous Release/Systems and Self–Releasing In–Mold Coatings for Polyurethane–Foam–Systems", J. Elastomers and Plastics, vol. 20, Jul., 1988, pp. 200–207.

Scott, "Use of Polyurethanes in Plastics Surface Coatings", Finishing, vol. 8, No. 4, Apr. 1984, pp. 23–24, 34.

Suddaby, "Improvements in RIM Encapsulated Windows", SAE Technical Paper Series, Int'l Congress and Exposition, Detroit, Michigan, Feb. 26–Mar. 2, 1990, No. 900517, pp. 1–5.

Wood, "For Really Better Parts: New SMC Technologies", Modern Plastics, Jan. 1980, vol. 57, No. One, pp. 56–59.

"Potential For In–Mould Coating of Exterior Parts", Plastics & Rubber Weekly, Jun. 7, 1986, pp. 12–17.

METHOD OF IN-MOLD COATING GOLF BALLS

BACKGROUND OF THE INVENTION

1. Field of the Invention

The present invention relates to golf balls having a cover and a core and to a method of coating the cover during or immediately following the molding of the cover material onto the core. The invention additionally relates to golf balls having a coated cover wherein the cover has external dimensions which correspond to the internal dimensions of the mold which adds dimples to the cover material.

2. Description of the Prior Art

Conventional golf balls can be classified as one-piece, two-piece, and three-piece balls. One-piece balls are molded from a homogeneous mass of material with a dimple pattern molded therein. Two-piece balls are made by molding a cover about a solid core. Three-piece are typically, but not always wound balls which are made by molding a cover about a wound core. The core of a two-piece ball is typically formed of rubber and can be solid, semi-solid or have a liquid center. A wound core is prepared by winding a lengthy thread of elastic material about the rubber core described above. The wound core is then surrounded with a cover material. The more recent trend in the golf ball art is towards the development of multi-component golf balls such as balls having two or more cover layers, two or more core layers or both multiple core and multiple cover layers.

Golf ball covers are presently formed from a variety of materials, such as balata, SURLYN®, IOTEK® and polyurethane, depending upon the performance characteristics desired for the golf ball. One of the softest materials conventionally used to form golf ball covers is balata, which the trans form of the 1,4-chain polymer of isoprene. For many years, balata was the standard cover stock material used in forming most golf balls. Balata covered balls are favored among professionals and more advanced amateur players because the softness of the cover allows the player to achieve spin rates sufficient to precisely control ball direction and distance, particularly on shorter approach shots.

However, because of its softness, balata is susceptible to cuts or other damage to the cover resulting from a "mis-hit" shot. Accordingly, harder, more durable cover materials, e.g., ionomer resins such as SURLYN®, have been developed which provide higher durability, but less spin and feel, than the balata balls. Resins such as SURLYN® are generally ionic copolymers of an olefin such as ethylene and a metal salt of an unsaturated carboxylic acid such as acrylic acid, methacrylic acid or maleic acid. Metal ions, such as lithium, zinc or sodium are used to neutralize some portion of the acidic groups in the copolymer resulting in a thermoplastic elastomer for use as a golf ball cover. Additionally, various softening comonomers such as n-butyl acrylate may be added during the ionomer manufacturing process to improve golf ball performance characteristics such as spin and feel. In the early 1980s, low modulus SURLYN® ionomers were introduced and subsequently utilized to impart more spin and an improved, balata-like feel to golf balls.

All golf balls, regardless of type, have an outer surface which contains a dimple pattern. As used herein, "dimples" refer the topical relief of the outer surface of the ball, typically depressions or indentations formed into to provide desired aerodynamic effects. However, the dimple pattern may comprise of any form of topical relief on the outer surface of the golf ball formed to provide a desired aerodynamic effect to the ball, including formations such as protrusions from the outer surface.

Further to the above, golf balls are provided in a variety of colors. Conventionally they are white, but they may be manufactured in essentially any desired color, including yellow, orange and pink. The color is imparted to the ball either by applying layers of paint to the outer surface of the cover or by incorporating a pigment directly into the cover composition. Typically, in a painted ball, a first primer layer is applied, followed by a second, finishing coat layer. After a ball has been provided with a color, identifying indicia such as a trademark, logo, identification number, model name or number and the like are hot stamped or pad printed onto the ball.

Golf balls must be capable of withstanding a variety of weather conditions such as strong sunlight, extreme temperature ranges, and immersion in water, preferably for an extended period. Further, the surface of a golf ball is flexed due to the impact every time it is struck with a club and consequently these surfaces must be able to withstand such repeated stresses. Moreover, especially with the recreational player, golf balls are susceptible to striking any of a number of hard, abrasive surfaces such as concrete, asphalt, brick, stone, etc. as a result of errant shots. It is therefore desirable for golf ball manufacturers that their golf balls be resistant to delamination or chipping of the paint layers, as such defects impact negatively upon the public perception of the quality of the golf ball. Likewise, golf ball manufacturers also seek to prevent obliteration of all or part of their trademarks, logos or other identifying indicia which identifies the brand of the ball to the playing public. Protective coatings are therefore applied to the surface of the golf ball cover. A clear primer coat and top coat layer are commonly applied to the cover to provide a high gloss and an overall enhanced appearance to the ball. In such coated balls, the various identifying indicia may be applied either to the cover, the primer coat or the topcoat.

Protective and decorative coating materials, as well as methods of applying such materials to the surface of a golf ball cover are well known in the golf ball art. Generally, such coating materials comprise urethanes, urethane hybrids, polyesters and acrylics. If desired, more than one coating layer can be used. Typical two pack polyurethane coatings include separate packages of polyol and diisocyanate. Conventionally, a primer layer such as a solvent-based or a water-based polymer may be applied to promote adhesion or to smooth surface roughness before the finish coat(s) are deposited on the golf ball. In general, a cured polyurethane top coat is most widely used as a protective coating material.

In-mold coating of substrates is known, but has never before been used to coat golf balls. For example, U.S. Pat. No. 4,515,710 describes an in-mold coating composition that is free radically cured to create a thermoset coating having good adhesion to a substrate, good surface smoothness, and good paintability. U.S. Pat. No. 4,242,415 describes another in-mold coating composition containing amine-terminated reactive liquid polymers, a vinyl monomer, and crosslinkable ester urethane resins. Neither of these references, however, nor any other references presently known describe the use of these or similar materials for the in-mold coating of golf balls.

One problem encountered during golf ball coating is that each coat typically needs to be applied to the golf ball surface in a separate operation after the final molding of the golf ball cover about the core. Each of these steps is time consuming as once each coating is applied to the ball surface, there is a need to allow that coat to cure for a period of time before the next coat is applied. Also, as each of the often successive coats are applied to the golf ball the definition of the curves on the molded golf ball are smoothed and lose their sharpness due to build-up of the coating composition on the ball's outer surface, which also increases the outer diameter of the ball.

Accordingly there exists a need in the golf ball art for a process of coating a golf ball using a method that reduces the amount of necessary steps. Further, there exists a need for a method of making an in-mold coated golf ball having a dimple pattern wherein the external dimensions of the coated ball are substantially the same as those of the internal dimensions of the golf ball mold cavity.

SUMMARY OF THE INVENTION

The present invention is directed to a process for in-mold coating of golf balls. The phrase "in-mold coating", as used herein, refers to the application of a coating material to a golf ball while the ball is in a mold. The process of the present invention offers a number of significant advantages over prior art processes used to coat golf balls. For example, the invention permits a significant reduction, if not a complete elimination, of the amount of solvents used in formulating and applying the coating upon the balls. This has a twofold beneficial effect, i.e., less solvent means less drying time, thus significantly reducing the duration of the coating process (e.g., 30 minutes vs. 20 hours for the prior art). The reduction in the amount of solvent also means a concurrent reduction in the amount of volatile organic compounds ("VOC") materials encountered in the spraying process, thus offering significant safety and environmental benefits.

Further, for elastomer cover materials such as urethanes there is a substantial increase in the bond strength or adhesion between the coating material and the underlying substrate (the ball cover) since the temperature and present conditions under which the coating is applied results in the occurrence of a chemical reaction between the coating material and the ball surface, thus leading to the creation of chemical, and not just a mechanical, bond between the coating and the ball.

However, for thermoplastic cover materials such as Surlyn, upon heating of the cover materials, the molecular motion of the polymer chains therein allows for entanglements with the coating material, thereby enhancing the interfacial bonding between the thermoplastic cover materials and the coating composition.

Still further, with the use of the claimed process it is possible to produce a coated golf ball having a crisp and sharp dimple pattern that is not obscured by numerous coating layers, and which is readily releasable from the molding apparatus. Another advantage to the use of the in-mold coating process of the invention is that it permits the production of golf balls with more intricate dimple patterns in comparison to those obtained in the prior art,where the golf balls are coated after molding.

One aspect of the invention is thus directed to a method of applying an in-mold coating upon the outer surface of a golf ball. The coating may be applied by a variety of methods in accordance with the invention including, in a first embodiment, forming a mold cavity between upper and lower mold dies, at least partially filling the cavity with a golf ball cover-forming composition and applying a desired pressure to the upper and lower mold dies to form, in the case of a two or three-piece ball, a golf ball cover around a central core. In another embodiment involving the formation of a one-piece ball, the cavity is filled with a golf-ball cover forming composition and a desired pressure is applied to the mold cavity to form a golf ball suitable for coating according to the invention. Thereafter, a golf ball coating material, such as a fluidized plastic material, e.g., a polyester or urethane, is introduced, e.g., by spraying, injection or any other method known in the art, into the mold cavity between the golf ball outer surface and the inner surface of the mold cavity where the material coats the outer surface of the golf ball cover and is then cured, e.g., by thermosetting, to form a coating layer upon the ball. When the coating material is directed into the mold cavity, the mold cavity pressure may optionally be reduced to facilitate the flow of the coating material over the ball surface.

In a further embodiment, particularly useful for applying a polyurethane coating to the outer golf ball surface, the method of the invention comprises the steps of: (1) forming a polyurethane coating composition by combining (a) a first component including at least one polyol; and (b) a second component comprising a substantially solvent-free isocyanate prepolymer; (2) forming an uncoated golf ball between at least two separable mold dies which form a mold cavity therebetween by molding the uncoated golf ball within the cavity until the golf ball reaches a condition where its surface has cured to the point that it is receptive to the application of the coating, i.e., wherein the coating material will not substantially penetrate the outer surface but will bond therewith; (3) injecting the coating composition into the mold cavity at a pressure substantially in excess of what the positive mold cavity pressure was immediately prior to injection while maintaining the dies in a pressurized, closed position whereby the coating composition is forced over the surface of the uncoated golf ball; and (4) curing the coated, formed golf ball.

A further aspect of the invention relates to in-mold coated golf balls produced according to the method of the invention. Such balls may be any type conventionally known in the art including one-piece, two-piece or wound. Once coated, the outer dimensions of these balls are substantially the same as the inner dimensions of the mold cavity in which they are coated.

DETAILED DESCRIPTION OF THE INVENTION

As used herein, the term "coating" means a material applied to the outer surface of a golf ball cover which may be opaque or transparent (i.e., known as a "clear coat"), which may impart a glossy or shiny appearance to the ball and which may provide some measure of protection and/or durability to the cover of the ball. Clear coats are generally free of pigmentation and are water white. However, any in-mold coating material, including those which contain one or more of a dye, pigment, optical brightener and/or other additives, is considered as falling within the scope of the invention.

The coating compositions useful in the present invention are those which are particularly useful in coating golf balls made by conventional molding techniques such as compression molding, injection molding and reactive material casting processes, all of which are well known in the art as evidenced, e.g. by the disclosure of U.S. Pat. Nos. 4,798,586 to Berard and 5,334,673 to Wu and Japanese Patent Publication No. 60-210272.

The in-mold coating materials appropriate for use in the present invention include any thermoplastic or thermosetting resin suitable for use with one-or more of the conventional golf ball cover materials such as balata, ionomers, including acrylic and methacrylic acid based ionomers, urethanes, styrenes and olefinic polymers, to name but a few. Useful coating materials include, but are not limited to thermoplastic and thermosetting epoxies, acrylics, urethanes, polyesters, amino resins, phenolic resins, silicone resins, organo silane resins and fluoro resins. The in-mold coatings produced according to the present invention preferably have a suitable viscosity to enable them to flow out in an even layer over molded parts within relatively short periods of time. It is also desirable that the in-mold coating materials used in the invention have storage stability such that they do not prematurely cure or phase separate during storage or equipment shutdowns. It is also preferable that such in-mold coatings exhibit resistance to abrasion, solvents, and external deformations while retaining good adhesion to the cover material and sufficient flexibility to prevent cracking due to flexural strains.

The preferred in-mold coating compositions for use in the method of the invention include two component urethanes composed of a polyol or polyamine (e.g., a diamine) first component and a isocyanate prepolymer second component such as those disclosed, for example in U.S. Pat. No. 5,387,750, expressly incorporated herein by reference. Polyester resins, such as those disclosed in U.S. Pat. No. 5,304,332, may also be used as the in-mold coatings according to the present invention. Other useful in-mold coating materials include hydroxyterminated telechelic rubber polymers and block copolymers of flexible polymers of unsaturated polyester resins as described in U.S. Pat. No. 5,389,443, or polyesterurethane together with a multifunctional epoxy compound as disclosed in U.S. Pat. No. 5,143,788. Additional in-mold coating components for use in the invention are known in the coating art and are described in U.S. Pat. Nos. 4,076,788; 4,081,578; 4,515,710; 4,189,517; 4,242,415; 4,245,006; 4,414,173; 4,477,405; 5,132,052 and 4,668,460.

Other weatherable and durable coating compositions can be used to coat golf balls according to the present invention. For example, a coating of thermoset fluorinated polymers is suitable for use in the present invention. In particular, fluorinated polymers available from Zeneca, Inc. under the tradenames LUMIFLOW 4-200F, LF-601, LF-710F, LFX-910LM, LF-916 and LF-9200 are suitable coating compositions. A blend of an urethane resin and a fluoropolymer may also be used.

Typical solvents known in the art can be used in the present invention to dilute the coating composition or to reduce viscosity include: xylene, toluene, methyl ethyl ketone, methyl amyl ketone, methyl isobutyl ketone, propylene carbonate, N-methyl pyrrolidone and the like.

For each 100 parts by weight of resin in the coating formulation, from 0 to about 100 parts by weight, or more preferably from 0 to 50 parts by weight, each of pigments, fillers, opacifiers, antioxidants, ultraviolet absorbers, or other additives may be added to the coating composition.

Some of the pigments contemplated for use in the invention are: carbon black, titanium oxide, chrome oxide (green), zinc oxide, ferrite yellow oxide, ferric oxides, raw sienna, burnt sienna, copper phthalocyanine blue, phthalocyanine green, ultramarine blue, toluidine red, parachlor red, cadmium reds and yellows, iron blues, and organic maroons. Silica, glass frit or flour, calcium carbonate, mica, antimony trioxide, fumed alumina, kaolin, talc, lithophone, zinc sulfide, zirconium oxide, calcium sulfate dihydrate, barium sulfate, china clay, diatomaceous earth, aluminum trihydrate, onyx four, metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, phthalycyanine blues and greens, organo reds, organo maroons and other organic pigments and dyes and calcium silicate are examples of additives, pigments, fillers and opacifiers contemplated. The fillers, pigments, and opacifiers may be suspended in the coating composition by the use of dispersing agents such as those taught in U.S. Pat. No. 4,016,115, which is incorporated herein by reference.

The pigments are formulated into a mill base by mixing with a dispersing resin which may be the same as the binder of the composition or may be another compatible dispersing resin or agent. The pigment dispersion is formed by conventional means such as sand grinding, ball milling, high speed dispersing or three roll milling. The mill base can then be blended with the binder of the composition to form the coating composition.

To improve weatherability of the coating composition, in particular with regard to clear coat compositions, about 0.01–5.0% by weight, based on the weight of the binder, of an ultraviolet light stabilizer or ultraviolet absorber, or a combination of ultraviolet light stabilizers and ultraviolet absorber, can be added to the clear coating composition. Typically useful ultraviolet light stabilizers and ultraviolet absorber are as follows:

Benzophenones such as hydroxy dodecyloxy benzophenone, 2,4-dihydroxybenzophenone, hydroxybenzophenones containing sulfonic groups and the like.

Triazoles such as 2-phenyl-4-(2',2'-dihydryoxylbenzoyl)-triazoles, substituted benzotriazoles such as hydroxyphenyltriazoles and the like.

Triazines such as 3,5-dialkyl-4-hydroxyphenyl derivatives of triazine, sulfur containing derivatives of dialyl-4-hydroxy phenyl triazines, hydroxy phenyl-1,3,5-triazine and the like.

Benzoates such as dibenzoate of diphenylol propane, tertiary butyl benzoate of diphenylol propane and the like.

Other ultraviolet light stabilizers that can be used include lower alkyl thiomethylene containing phenols, substituted benzenes such as 1,3-bis-(2'-hydroxybenzoyl)benzene, metal derivatives of 3,5-di-t-butyl4-hydroxy phenyl propionic acid, asymmetrical oxalic acid, diarylamides, alkylhydroxy-phenyl-thioalkanoic acid ester and the like.

Particularly useful ultraviolet light stabilizers that can be used are hindered amines of bipiperidyl derivatives such as those disclosed in Murayama, et al., U.S. Pat. No. 4,061,616, issued Dec. 6, 1977.

When used as a clear coat, the coating composition can also contain transparent pigments to improve durability and weatherability. These transparent pigments should have the same or a similar refractive index as the binder of the clear coat and have a small particle size of about 0.015–50 microns. Typical pigments that can be used in the clear coat in a pigment to binder weight ratio of about 1:100 to 10:100 are inorganic siliceous pigments, such as silica pigments and have a refractive index of about 1.4–1.6.

If the coating composition is used as a conventional pigmented monocoat coating composition or as the basecoat of a clear coat/basecoat composition, the composition preferably contains pigments in a pigment to binder weight ratio of about 1:100–50:100. It may additionally be advantageous to use the aforementioned ultraviolet stabilizers and/or ultraviolet absorbers in the pigmented composition.

Mixing of the ingredients of the in-mold coating composition should be thorough. Injection molding, compression molding, transfer molding, or other molding apparatus or machines can be used for the in-mold coating. Molding apparatus and methods may be found in U.S. Pat. Nos. 4,076,780; 4,076,788; 4,081,578; 4,082,486; 4,189,517; 4,222,929; 4,245,006; 4,239,796; 4,239,808 and 4,331,735. See also, "Proceedings of the Thirty-Second Annual Conference Reinforced Plastics/Composites Institute," SPI Washington, February, 1977, Griffith et al., Section 2-C, pages 1–3 and "33rd Annual Technical Conference, 1978, Reinforced Plastics/Composites Institute, The Society of the Plastics Industry, Inc.," SPI Ongena Section 14-B, pages 107.

According to the invention the in-mold coating method comprises forming a mold cavity between upper and lower mold dies, at least partially filling the cavity with a golf ball cover-forming composition and applying a desired pressure to the upper and lower mold dies to form, in the case of a two or three-piece ball, a golf ball cover around a central core. In another embodiment involving the formation of a one-piece ball, the cavity is filled with a golf-ball cover forming composition and a desired pressure is applied to the mold cavity to form a golf ball suitable for coating according to the invention. Thereafter, a golf ball coating material, such as a fluidized plastic material, e.g., a polyester or urethane, is introduced, e.g., by spraying, injection or any other method known in the art, into the mold cavity between the golf ball outer surface and the inner surface of the mold cavity where the material coats the outer surface of the golf ball cover and is then cured, e.g., by thermosetting, to form a coating layer upon the ball. When the coating material is directed into the mold cavity, the desired pressure may optionally be reduced to facilitate the flow of the coating material over the ball surface. Such an in-mold coating method is described, for instance, in U.S. Pat. No. 4,668,460, entitled "METHOD OF MOLDING AND COATING A SUBSTRATE IN A MOLD," issued May 26, 1987.

Alternatively, if desired, the uncoated ball may be removed from the first, "ball-forming mold" and coated in a separate, second mold in the manner indicated above while the first mold is operated to produce additional balls to be coated.

A preferred method for in-mold coating an uncoated golf ball with a polyurethane coating includes the steps of (1) forming a polyurethane coating composition by combining (a) a first component including at least one polyol; and (b) a second component comprising a substantially solvent-free isocyanate prepolymer; (2) forming an uncoated golf ball between at least two separable mold dies which form a mold cavity there between by molding the uncoated golf ball within the cavity until the golf ball reaches a condition where its surface has cured to the point that it is receptive to the application of the coating, i.e., wherein the coating material will not substantially penetrate the outer surface but will bond therewith; (3) introducing the coating composition into the mold cavity at a pressure in excess of what the positive mold cavity pressure was immediately prior to introduction while maintaining the dies in a pressurized, closed position whereby the coating composition is forced over the surface of the uncoated golf ball; and (4) curing the coated, formed golf ball.

To form urethane coating composition for use in the present invention, predetermined volumes of each component are mixed in an impingement or static mixer prior to injection into the mold. Preferably, to ensure the proper mixing, either the polyol component, the isocyanate component or both components are heated so that the viscosity of these components are approximately the same. The coating composition can either be injected into the mold after the uncoated golf ball has completely cured, or, more preferably, when the substrate has sufficiently cured so that the coating will not penetrate the substrate. The coating composition is introduced into the mold cavity between the surface of the uncoated golf ball and the mold surface. Thereafter, the mold is retained in a closed position for a sufficient period to allow the molded golf ball to complete further curing and to allow the coating composition to be cured as an adherent coating over the outer surface of the molded golf ball.

The cure time required for the coatings of the invention should be slow enough to allow the coating to flow over the substrate in the mold prior to excessive gelation, but short enough to allow substantial curing within the molding cycle. The cure time of the coating depends on a number of factors, including the thickness of the coating, the temperature of the mold, the amount of catalyst and the reactivity of the polyol and the isocyanate prepolymer. The cure time of the coating is typically about 0.01–30.0 minutes at a mold temperature of about 25°–350° C.

Typical coating compositions according to the present invention have a thickness of from about 0.05–100.0 mils or more preferably from about 0.05–20.0 mils.

While it is preferred that the above described materials be used for in-mold coating of golf balls according to the invention, other materials may be used for this purpose, including those described in any of the following patents U.S. Pat. Nos. 3,216,877; 4,205,028; 4,228,113; 4,287,310; 4,315,884; 4,499,235; 4,873,274.

Generally speaking, the in-mold coating compositions contemplated for use in the invention can be applied to the substrate and cured at a temperature of from about 25° to 350° C. and at a pressure of from about 1 psi to about 1,000 psi for from about 0.01 to 30.0 minutes. This creates a promising coating for use in preserving and protecting golf ball covers.

All aforementioned patents and other publications are herein specifically incorporated by reference in their entirety.

The scope of the following claims is intended to encompass all obvious changes in the details, materials, and arrangement of parts that will occur to one of ordinary skill in the art.

I claim:

1. A method of applying a coating material to an outer dimpled surface of a golf ball, which method comprises:

forming a mold cavity between upper and lower mold dies, said mold cavity configured and adapted for molding a golf ball;

molding within said mold cavity a golf ball having an outer dimpled surface under a first pressure greater than ambient pressure until the golf ball is sufficiently cured to receive a coating that will not substantially penetrate the outer surface of the ball;

preparing an in-mold golf ball coating composition;

introducing a sufficient amount of said coating composition into the mold cavity between the outer dimpled surface of the golf ball and an inner surface of said mold cavity to substantially surround and coat the dimpled outer surface of said golf ball;

curing said coating composition to form a coated golf ball having a dimple pattern thereon, said coated golf ball having at least one layer of said coating composition; and removing said coated golf ball having a dimple pattern thereon from the mold cavity.

2. The method of claim 1 which further comprises regulating the amount of said coating composition added to said mold cavity such that, after curing, an outer diameter of the coated ball is substantially the same as an inner diameter of said mold cavity.

3. The method of claim 1 further comprising reducing the first pressure within said mold cavity when the coating composition is introduced therein.

4. The method of claim 1 further comprising substantially increasing the first pressure within the mold cavity when the coating composition is introduced therein.

5. The method of claim 1 which further comprises molding a golf ball comprising a core and at least one cover layer.

6. The method of claim 5 which further comprises formulating an outermost cover layer of said golf ball from a material selected from the group consisting of balata, ionomeric resins, urethanes, styrenes, olefinic polymers and mixtures thereof.

7. The method of claim 1 which further comprises introducing said coating composition into the mold cavity in a form selected from the group consisting of liquids and finely divided solids.

8. The method of claim 7 wherein said coating composition comprises a material selected from the group consisting of epoxies, acrylics, urethanes, polyesters, amino resins, phenolic resins, silicone resins, organo silane resins, and mixtures thereof.

9. The method of claim 7 wherein said coating composition comprises a polyurethane.

10. The method of claim 7 wherein said coating composition comprises a polyester resin.

11. The method of claim 10 wherein said coating composition is a block copolymer of flexible polymers of at least one unsaturated polyester resin.

12. The method of claim 7 wherein said coating composition is a hydroxyterminated telechelic rubber polymer.

13. The method of claim 7 wherein said coating composition is comprised of a material selected from the group consisting of thermoset fluorinated polymers and copolymers and terpolymers thereof, and mixtures of said fluorinated polymers and polyurethanes.

14. The method of claim 1 which further comprises adding at least one solvent to said coating composition.

15. The method of claim 14 wherein said at least one solvent is selected from the group consisting of xylene, toluene, methyl ethyl ketone, methyl amyl ketone, methyl isobutyl ketone, propylene carbonate and N-methyl pyrrolidone.

16. The method of claim 1 which further comprises adding to said coating composition prior to applying said composition to the outer surface of the golf ball at least one of a material selected from the group consisting of pigments, fillers, opacifiers, antioxidants, ultraviolet absorbers, dyes and optical brighteners.

17. The method of claim 16 wherein said pigments are substantially transparent pigments having a particle size of about 0.015 microns to about 50 microns and a refractive index of between about 1.4 and 1.6.

18. The method of claim 1 which comprises adding to said coating composition at least one material selected from the group consisting of fillers, pigments and opacifiers and wherein said at least one material is suspended within said coating composition.

19. The method of claim 1 wherein said cured coating composition has a thickness of from about 0.05 to about 100.0 mils.

20. The method of claim 19 wherein said cured coating thickness is about 0.5 mils to about 20 mils.

21. The method of claim 1 wherein said coating composition is cured after application to said ball at a temperature of from about 25° to 350° C. and at a pressure of from about 1 psi to about 1,000 psi for a time of from about 0.01 to about 30.0 minutes.

22. The method of claim 1 which further comprises depositing at least one additional coating composition layer upon said coated golf ball.

23. A method of applying a urethane coating material to an outer dimpled surface of a golf ball, which method comprises:

forming a mold cavity between upper and lower mold dies, said mold cavity configured and adapted for molding a golf ball;

formulating a polyurethane coating composition by mixing a first component including at least one polyol or polyamine and a second composition comprising a substantially solvent-free isocyanate prepolymer;

forming within said mold cavity a golf ball with an outer dimpled surface at a first pressure greater than ambient pressure;

allowing the formed golf ball to cure within said mold cavity until the golf ball is sufficiently cured to receive a coating that will not substantially penetrate the outer surface of the ball;

reducing the first pressure to a value substantially less than that used in forming said ball;

introducing a sufficient amount of said polyurethane coating composition into said mold cavity between the outer dimpled surface of the golf ball and an inner surface of the mold cavity at a second pressure in excess of the first pressure to substantially surround and coat the outer dimpled surface of the golf ball;

curing said polyurethane coating composition to form a coated golf ball having a dimple pattern thereon, said coated golf ball having at least one layer of said polyurethane coating composition; and removing said coated golf ball having a dimple pattern thereon from the mold cavity.

24. The method of claim 23 wherein said formed golf ball is completely cured prior to the introduction of the polyurethane coating composition into the mold cavity.

25. The method of claim 23 which further comprises sufficiently heating said polyol component, said isocyanate prepolymer or both prior to mixing said polyol component and said isocyanate prepolymer such that the viscosity of said polyol composition is substantially the same as that of said isocyanate prepolymer.

* * * * *